United States Patent [19]

Aizawa et al.

[11] Patent Number: 4,749,740

[45] Date of Patent: * Jun. 7, 1988

[54] METHOD OF PRODUCING A SILICONE DEFOAMER COMPOSITION

[75] Inventors: Koichi Aizawa; Shingo Sewa; Hideki Nakahara, all of Kanagawa, Japan

[73] Assignee: Dow Corning Kabushiki Kaisha, Tokyo, Japan

[ * ] Notice: The portion of the term of this patent subsequent to Jan. 27, 2004 has been disclaimed.

[21] Appl. No.: 930,611

[22] Filed: Nov. 14, 1986

Related U.S. Application Data

[63] Continuation-in-part of Ser. No. 738,922, May 29, 1985, Pat. No. 4,639,489.

[30] Foreign Application Priority Data

May 30, 1984 [JP] Japan ............................. 59/108450

[51] Int. Cl.[4] .............................................. C08K 3/36
[52] U.S. Cl. .................................... 524/588; 252/321; 252/358; 524/863
[58] Field of Search ................. 524/588, 863; 252/321, 252/358

[56] References Cited

U.S. PATENT DOCUMENTS

| | | | |
|---|---|---|---|
| 3,455,839 | 7/1969 | Rauner | 252/321 |
| 3,560,401 | 2/1971 | O'Hara et al. | 252/358 |
| 4,101,499 | 7/1978 | Herzig | 524/863 |
| 4,145,308 | 3/1979 | Simoneau et al. | 252/321 |
| 4,443,359 | 4/1984 | Shimizu et al. | 252/321 |
| 4,486,336 | 12/1984 | Pape et al. | 252/358 |
| 4,554,187 | 11/1985 | Grape et al. | 524/588 |
| 4,639,489 | 1/1987 | Aizawa et al. | 524/588 |

Primary Examiner—Lewis T. Jacobs
Attorney, Agent, or Firm—George A. Grindahl

[57] ABSTRACT

Foam control compositions are prepared by reacting a mixture of components which include a polyorganosiloxane fluid bearing one or more hydroxyl and/or hydrocarbonoxy groups, a resinous siloxane or a silicone resin-producing silicon compound, a finely divided filler material and a catalyst to promote the reaction of the listed components. The compositions can optionally contain a polyorganosiloxane fluid which is substantially free of reactive groups and/or a polyorganosiloxane fluid bearing two or more hydroxyl and/or hydrocarbonoxy groups.

20 Claims, No Drawings

METHOD OF PRODUCING A SILICONE DEFOAMER COMPOSITION

BACKGROUND OF THE INVENTION

This is a continuation-in-part application of application Ser. No. 738,922 filed on May 29, 1985 now U.S. Pat. No. 4,639,489, issued Jan. 27, 1987.

This invention relates to a method of producing a defoamer composition.

The foaming of a liquid presents a serious problem in a variety of industrial processes including the treatment of the liquid itself or the treatment of something else by the liquid. The foaming of the liquid brings about a reduction in the efficiency of the treatment or a lowering in the quality of the product to be manufactured.

It is known that the problem of foaming may be solved by a defoamer having the effect of breaking foam in a liquid or inhibiting or reducing its foamability. A silicone defoamer is particularly suitable, since it is chemically stable and hardly has an influence on the liquid to which it is applied, and its use in a very small quantity produces a relatively large defoaming effect.

Various types of silicone defoamers have hitherto been proposed and are known. For example, Japanese Patent Publication No. 23613/1970 describes a defoamer composition composed of dimethylpolysiloxane oil, a specific siloxane resin and silica aerogel. Japanese Patent Publication No. 1602/1972 describes a defoamer composition obtained by heating polyorganosiloxane with a finely powdered additive, such as silica, in the presence of an alkaline substance. The known silicone defoamers have, however, the disadvantage that their defoaming effect, particularly their foam inhibiting effect, lasts only for a short period of time and fails to satisfy the requirement of a process in which it is necessary to inhibit foam for a long period of time.

Under these circumstances, it is an object of this invention to provide a method of producing a defoamer composition which maintains an excellent foam inhibiting effect for a long period of time.

DETAILED DESCRIPTION OF THE INVENTION

This invention is characterized by reacting at a temperature of 50° C. to 300° C.:

(1) 0 to 100 parts by weight of a polyorganosiloxane having a viscosity of 20 to 100,000 cs at 25° C. and being expressed by the general formula $R^1{}_a SiO_{(4-a)/2}$ in which $R^1$ is a monovalent hydrocarbon or halogenated hydrocarbon group having 1 to 10 carbon atoms and a has an average value of from 1.9 to 2.2;

(2) 0 to 100 parts by weight of a polyorganosiloxane having a viscosity of 200 to several million cs at 25° C. and being expressed by the general formula $R^2{}_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of from 1.9 to 2.2 and c has a sufficiently large value to give at least one —$OR^3$ group in each molecule, said —$OR^3$ group being present at least at the end of a molecular chain; the total of components (1) and (2) being 100 parts by weight;

(3) 0.5 to 20 parts by weight for every 100 parts by weight of the components (1) and (2) of one or more compounds selected from the following a) to d);

(a) an organosilicon compound of the general formula $R^4{}_d SiX_{4-d}$ in which $R^4$ is a monovalent hydrocarbon group having 1 to 5 carbon atoms, X is a hydrolyzable group and d has an average value of one or less;

(b) a partially hydrolyzed condensate of the compound (a);

(c) a siloxane resin consisting essentially of $(CH_3)_3 SiO_{\frac{1}{2}}$ and $SiO_2$ units and having a $(CH_3)_3 SiO_{\frac{1}{2}}/SiO_2$ ratio of 0.4/1 to 1.2/1; and (d) a condensate of the compound c) with the compound (a) or (b);

(4) 0.5 to 30 parts by weight of a finely divided filler for every 100 parts by weight of the components (1) and (2);

(5) a catalytic amount of a compound for promoting the reaction of the other components; and (6) 0 to 20 parts by weight, for every 100 parts by weight of the components (1) and (2), of a polyorganosiloxane having a viscosity of 5 to 200 cs at 25° C. and being expressed by the general formula $R^8{}_e(R^9O)_f SiO_{(4-e-f)/2}$ in which $R^8$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 on an average and f has a sufficiently large value to give at least two —$OR^9$ groups in each molecule at the end of a molecular chain.

The invention will now be described more specifically. According to this invention, a mixture of the components (1) and/or (2) along with (3) to (5) or said mixture further containing the component (6) is reacted under heat to produce a defoamer composition.

Component (1) is a polyorganosiloxane expressed by the general formula $R^1{}_a SiO_{4-a)/2}$ and having a viscosity of 20 to 100,000 centistokes (cs) at 25° C. The organo groups $R^1$ of the polyorganosiloxane are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the formula, a is a value ranging from 1.9 to 2.2. The polyorganosiloxane consists essentially of $R^1{}_2 SiO$ and $R^1{}_3 SiO_{\frac{1}{2}}$ units, but may further contain $R^1 SiO_{3/2}$ and $SiO_{4/2}$ units if the value of a representing the molar ratio of $R^1/Si$ is within the range hereinabove specified. It does not substantially contain any OH or hydrolyzable groups, though it may contain a residual amount thereof which may be introduced during the process of production. It is particularly preferable to use polydimethylsiloxane endblocked by a trimethylsilyl group and having a viscosity of 350 to 15,000 cs at 25° C.

Component (2) is a polyorganosiloxane expressed by the general formula $R^2{}_b(R^3O)_c SiO_{(4-b-c)/2}$ and having a viscosity of 200 to several, for example 1, 2, 5, 10, 20 and 50, million centistokes at 25° C. $R^2$ is a monovalent hydrocarbon or halogenated hydrocarbon group having one to ten carbon atoms. Specific examples thereof are those hereinbefore given for $R^1$. $R^3$ is a hydrogen atom or monovalent hydrocarbon group having one to ten carbon atoms, such as those given for $R^2$, and the —$OR^3$ group is present at least at the end of a molecular chain of polyorganosiloxane. The value of b ranges from 1.9 to 2.2 and c is a sufficiently large value to give at least one —$OR^3$ group in each molecule. It is particularly preferable to use polydimethylsiloxane having an end hindered by a hydroxyl group and having a viscosity of 1,000 to 50,000 cs at 25° C.

Component (3) is any of the compounds a) to d):

(a) An organosilicon compound of the general formula $R^4_dSiX_{4-d}$. $R^4$ is a monovalent hydrocarbon group having one to five carbon atoms. X is a hydrolyzable group, such as —$OR^5$ or —$OR^6OR^7$. $R^6$ is a divalent hydrocarbon group having one to five carbon atoms and $R^5$ or $R^7$ are each hydrogen or a monovalent hydrocarbon group having one to five carbon atoms. The average value of d does not exceed 1. Therefore, this compound is one of the formula $R^4SiX_3$ or $SiX_4$, or a mixture thereof. These organic silicon compounds are well known in the silicone industry and examples thereof include $CH_3Si(OCH_3)_3$, $CH_3Si(OC_2H_5)_3$, $CH_2=CHSi(OCH_3)_3$, $C_6H_5Si(OC_2H_5)_3$, $Si(OC_2H_5)_4$, $Si(OC_3H_7)_4$, $CH_2=CHSi(OC_2H_5)_3$ and $Si(OC_2H_4OC_2H_5)_4$.

(b) A partially hydrolyzed condensate of the compound a). This condensate can be prepared by a known method.

(c) A siloxane resin consisting essentially of $(CH_3)_3SiO_{\frac{1}{2}}$ and $SiO_2$ units and having a $(CH_3)_3SiO_{\frac{1}{2}}/SiO_2$ ratio of 0.4/1 to 1.2/1. These siloxane resins are commercially available. They are produced by the cohydrolysis and condensation of $(CH_3)_3SiCl$ and $SiCl_4$ or the reaction between $(CH_3)_3SiCl$ with a silicate solution. A siloxane resin usually contains residual amounts of hydroxyl groups, e.g., about 2 to 5% by weight. The residual hydroxyl group can be decreased to substantially zero by a known method, if desired. All of these siloxane resins are usable for the purpose of this invention irrespective of the amount of the residual hydroxyl group.

(d) A condensate of the siloxane resin c) with the compound (a) or (b). Condensation of siloxane resins with hydrolyzable silanes can be accomplished by a known method.

Component(4) is a finely divided filler such as fume $TiO_2$, $Al_2O_3$, $Al_2O_3/SiO_2$ and $SiO_2$.

Silica ($SiO_2$) can be produced by a dry method such as the thermal decomposition of a silicon halide or the reaction of a substance containing silicic acid under heat, or silica produced by a wet method such as the decomposition of a metal salt of silicic acid, e.g., sodium silicate, by an acid or the aerogel method. Various grades of silica having a particle size of several millimicrons to several microns and a specific surface area of about 500 to 50 m²/g are commercially available.

Fume $TiO_2$, $Al_2O_3$ and $Al_2O_3/SiO_2$ can be prepared by the well-known process of burning $TiCl_4$, $AlCl_3$ and $SiCl_4$ and mixtures thereof.

Component (5) is a compound used as a catalyst for promoting the reaction of the other components. It is preferably selected from siloxane equilibration and/or silanol-condensing catalysts such as alkali metal hydroxides, alkali metal silanolates, alkali metal alkoxides, quaternary ammonium hydroxides and silanolates, quaternary phosphonium hydroxides and silanolates and metal salts of organic acids. These compounds are well known in the field of silicone chemistry and are not considered to need any detailed description. KOH and CsOH are examples of alkali metal hydroxides. If one of them is reacted with low molecular silicone or silicate or a partially hydrolyzed product thereof, there is obtained an alkali metal silanolate. If the low molecular silicone or silicate which is employed corresponds to any of the compounds from which the component (3) is selected, the resulting alkali metal silanolate is also suitable for use as component (3) and if its amount covers the quantity required of component (3), it is not always necessary to use any additional component (3). The alkali metal alkoxide is a product of the reaction between an alkali metal hydroxide and an alcohol having one to five carbon atoms. Examples of quaternary ammonium hydroxides are betahydroxyethyltrimethyl ammonium hydroxide, benzyl- trimethyl ammonium hydroxide and tetramethyl ammonium hydroxide. Examples of quaternary phosphonium hydroxides are tetrabutyl phosphonium hydroxide and tetraethylphosphonium hydroxide. Examples of the metal salts of organic acids are dibutyltin dilaurate, stannous acetate or octanoate, lead naphthenate, zinc octanoate, iron 2-ethylhexoate and cobalt naphthenate.

Component (6) is a polyorganosiloxane expressed by the 1 general formula $R^8_e(R^9O)_fSiO_{(4-e-f)/2}$ and having a viscosity of 5 to 200 cs at 25° C. $R^8$ is a monovalent hydrocarbon or halogenated hydrocarbon group having one to ten carbon atoms. $R^9$ is hydrogen or a monovalent hydrocarbon group having one to ten carbon atoms. The value of e ranges from 1.9 to 2.2. It is the same as the polyorganosiloxane used as component (2), except that component (6) has a viscosity of 5 to 200 cs at 25° C., and except that f is a sufficiently large value to give two or more —$OR^9$ groups in each molecule. It is particularly preferable to use polydimethylsiloxane having an end hindered by a hydroxyl group and having a viscosity of 10 to 50 cs at 25° C.

A mixture of components (1) and/or (2) along with (3) to (5), optionally containing component (6) is reacted under heat to produce a silicone defoamer composition. The proportions of the components are:

Component (1)—0 to 100 parts by weight;
Component (2)—100 to 0 parts by weight;
Component (3)—0.5 to 20, preferably 1 to 7, parts by weight;
Component (4)—0.5 to 30, preferably 1 to 7, parts by weight;
Component (5)—A catalytic amount usually in the range of 0.03 to 1 part by weight;
Component (6)—0 to 20, preferably 1 to 10, parts by weight;

the proportion of each of components (3) to (6) being shown for a total of 100 parts by weight of (1) plus (2). The proportions of components (1) and (2) depend largely on their viscosity. Component (2) having a high viscosity, e.g., close to that of gum, can be used if it is combined with component (1) of low viscosity. It is preferable to use a mixture of (1) and (2) which has a viscosity of 1,000 to 100,000 cs at 25° C.

An appropriate mixture of the components each in an appropriate quantity may be prepared by mixing all the components except (4) and then admixing (4) uniformly by an appropriate dispersing device, such as a homomixer, colloid mill or triple roll mill. The mixture is heated to a temperature of 100° C. to 300° C. and reacted for one to eight hours, although the reaction time varies depending on the temperature. The details of the reaction of the various components is not clear. However, it is apparent that a reaction takes place because no defoaming effect is expected from a simple mixture of the components which is not heated. It is preferable to carry out the mixing and heating of the components in an inert gas atmosphere in order to avoid any danger and remove volatile matter (unreacted matter, by-products, etc.).

The mixing order of the components and the heating temperature and time as hereinabove stated are not critical, but can be changed as required.

The silicone defoamer composition produced by this invention may be used as it is, or in the form of a solution obtained by dispersion in an appropriate solvent or an emulsion obtained by a known emulsifying method, and provides a defoamer having a good defoaming effect which lasts for a long period of time.

The invention will now be described with reference to examples which are merely illustrative of this invention.

EXAMPLE 1

A three-necked flask having a capacity of one liter and provided with a stirrer and devices for introducing nitrogen gas thereinto and discharging it therefrom was charged with 378 g of polydimethylsiloxane endblocked by trimethylsilyl groups and having a viscosity of 1,000 cs at 25° C., 180 g of polydimethylsiloxane having an end hindered by a hydroxyl group and having a viscosity of 12,500 cs at 25° C. and 18 g of ethyl polysilicate ("Silicate 45" of Tama Kagaku Kogyo Co., Ltd.). They were stirred and heated. When a temperature of 130° C. to 140° C. was reached, 3 g of a catalyst A, which had been obtained by reacting at 120° C. for 15 minutes 90 g of polydimethylsiloxane endblocked by trimethylsilyl groups and having a viscosity of 1,000 cs at 25° C. and 10 g of KOH, were added, and stirring and heating were continued. Then, 30 g of silica ("Aerogel #200" of Nippon Aerogel Co. having a surface area of 200 m2/g) and 30 g of polydimethylsiloxane having an end hindered by a hydroxyl group and having a viscosity of 40 cs at 25° C. were added and dispersed uniformly by a homomixer. Heating was continued at 180° C. for four hours to complete the reaction. The reaction product was heated for an hour at 180° C. and a reduced pressure of 40 mm Hg, whereby the unreacted matter and the by-product of the reaction were removed. Then, it was cooled to ambient temperature to yield a viscous, colorless and transparent silicone defoamer composition (Composition A). The whole process was carried out in a nitrogen gas atmosphere.

EXAMPLE 2

A silicone defoamer composition (Composition B) was produced by repeating Example 1 except that the polydimethylsiloxane having an end hindered by a hydroxyl group and having a viscosity of 40 cs at 25° C. was not used.

EXAMPLE 3

A silicone defoamer composition (Composition C) was produced by repeating Example 1 except that the polydimethylsiloxane having an end hindered by a hydroxyl group and having a viscosity of 12,500 cs at 25° C. was replaced by one having a viscosity of 2,000 cs at 25° C.

EXAMPLE 4

The same apparatus as in Example 1 was used to stir and heat 384 g of polydimethylsiloxane endblocked by trimethylsilyl groups and having a viscosity of 1,000 cs at 25° C. and 6 g of a catalyst B (Silanolate obtained by reacting 95 g of n-propylorthosilicate and 5 g of KOH at 110° C. for 20 minutes). When a temperature of 100° C. to 110° C. was reached, 180 g of polydimethylsiloxane having an end hindered by a hydroxyl group and having a viscosity of 12,500 cs at 25° C. were added and stirring and heating were continued. After several tens of minutes, 30 g of silica of the same type as that used in Example 1 were added and dispersed uniformly by a homomixer, and the mixture was heated to 230° C. It was reacted at 230° C. for two hours and cooled to ambient temperature to yield a silicone defoamer composition (Composition D). The whole process was carried out in a nitrogen gas atmosphere.

EXAMPLE 5

384 g of polydimethylsiloxane having an end hindered by trimethylsilyl and having a viscosity of 1,000 cs at 25° C. and 25.8 g of a siloxane resin consisting of $(CH_3)_3SiO_{1/2}$ and $SiO_2$ units and having a $(CH_3)_3SiO_{1/2}/SiO_2$ ratio of 0.4/1 to 1.2/1 were uniformly mixed with stirring in a one liter beaker. Added to the mixture were 180 g of polydimethylsiloxane having an end hindered by a hydroxyl group and having a viscosity of 12,500 cs at 25° C. After several minutes of stirring, 3 g of a catalyst C, which had been prepared by reacting 90 g of isopropyl alcohol and 10 g of KOH at 80° C. for 20 minutes, were added and heating was started. When a temperature of 130° C. to 140° C. was reached, 30 g of silica of the same type as that used in Example 1 were uniformly dispersed by a homomixer. Then, the apparatus of Example 1 was used to carry out two hours of reaction at 230° C. The reaction product was heated for an hour at 180° C. and a reduced pressure of 40 mm Hg, whereby the unreacted matter and the by-product of the reaction were removed. Then, it was cooled to ambient temperature to yield a silicone defoamer composition (Composition E).

EXAMPLE 6

The apparatus of Example 1 was used to stir and mix uniformly 552 g of polydimethylsiloxane endblocked by trimethylsilyl groups and having a viscosity of 1,000 cs at 25° C., 18 g of the same siloxane resin as that used in Example 5 and 0.78 g of lead octylate. Then, 18 g of the same silica as that used in Example 1 were added and dispersed uniformly by a homomixer. Added to the mixture were 1.2 g of the same ethyl polysilicate as that used in Example 1 and 120 g of polydimethylsiloxane having an end hindered by a hydroxyl group and having a viscosity of 2,000 cs at 25° C. The resulting mixture was reacted at 200° C. for two hours and the reaction product was cooled to yield a silicone defoamer composition (Composition F). The whole process was carried out in a nitrogen gas atmosphere.

COMPARATIVE EXAMPLE 1

A uniform mixture was prepared under stirring from 570 g of the same polydimethylsiloxane having an end hindered by trimethylsilyl as that used in Example 1 and 3 g of catalyst C of Example 5 and 30 g of the same silica as that used in Example 1 were uniformly dispersed in the mixture by a triple roll mill. The resulting mixture was placed in the apparatus of Example 1 purged with nitrogen gas and reacted at 220° C. for two hours to yield a comparative silicone defoamer composition (Composition P).

COMPARATIVE EXAMPLE 2

A comparative silicone defoamer composition (Composition Q) was produced by repeating Comparative Example 1 except that the reaction was carried out at 280° C. for two hours.

COMPARATIVE EXAMPLE 3

A uniform solution was prepared by dissolving 15 g of the same siloxane resin as that used in Example 5 in 525 g of the same polydimethylsiloxane having an end hindered by trimethylsilyl as that used in Example 1 and 60 g of silica produced by a wet method ("Degussa FK 383 DS" of Degussa, USA) were uniformly dispersed in the solution by a triple roll mill. The mixture was placed in the apparatus of Example 1, purged with nitrogen gas and reacted at 180° C. for two hours to yield a silicone defoamer composition (Composition R).

EXAMPLE 7

The apparatus of Example 1 was used to stir and heat 378 g of polydimethylsiloxane endblocked by trimethylsilyl groups and having a viscosity of 12,500 cs at 25° C., 180 g of the same polydimethylsiloxane having an end hindered by a hydroxyl group as that used in Example 1 and 18 g of the same ethyl polysilicate as that used in Example 1. When a temperature of 130° C. to 140° C. was reached, 3 g of catalyst A of Example 1 were added and stirring was continued for several minutes. Then, 30 g of the same silica as that used in Example 1 were added and dispersed uniformly by a homomixer. The mixture was heated at 230° C. for two hours to complete its reaction. The reaction product was heated for an hour at 180° C. and a reduced pressure of 40 mm Hg, whereby the unreacted matter and the by-product of the reaction were removed. Then, it was cooled to yield a silicone defoamer composition (Composition G).

EXAMPLE 8

A uniform mixture was prepared by a homomixer from 528 g of polydimethylsiloxane having an end hindered by trimethylsilyl and having a viscosity of 1,000 cs at 25° C. and 30 g of polydimethylsiloxane having an end hindered by a hydroxyl group and having a viscosity of several million cs comparable to that of gum at 25° C. Added to the mixture were 18 g of ethyl polysilicate ("Silicate 45" of Tama Kagaku Kogyo Co., Ltd.) and they were stirred and heated. When a temperature of 130° C. to 140° C. was reached, 3 g of catalyst A of Example 1 were added and stirring and heating were continued. Then, 30 g of silica (Aerogel #200) were added and dispersed uniformly by a homomixer. Then, Example 1 was repeated for reacting the mixture and thereby producing a silicone defoamer composition (Composition H).

EXAMPLE 9

The apparatus of Example 1 was used to stir and mix uniformly 384 g of polydimethylsiloxane endblocked by trimethylsilyl groups and having a viscosity of 1,000 cs at 25° C. and 25.8 g of a partially hydrolyzed condensate prepared from the same siloxane resin as that used in Example 5 and ethyl orthosilicate. Added to the mixture were 180 g of polydimethylsiloxane having an end hindered by a hydroxyl group and having a viscosity of 12,500 cs at 25° C. After several minutes of stirring, 3 g of catalyst C of Example 5 were added and the mixture was heated under stirring. When a temperature of 130° C. to 140° C. was reached, 30 g of the same silica as that used in Example 1 were added and mixed uniformly by a homo-mixer. The mixture was, then, reacted at 230° C. for two hours and the reaction product was heated for an hour at 180° C. and a reduced pressure of 40 mm Hg, whereby the unreacted matter and the by-product of the reaction were removed. Then, it was cooled to ambient temperature to yield a silicone defoamer composition (Composition I).

COMPARATIVE EXAMPLE 4

The apparatus of Example 1 was used to stir uniformly 390 g of the same polydimethylsiloxane endblocked by trimethylsilyl groups as that used in Example 1 and 180 g of the same polydimethylsiloxane having an end hindered by a hydroxyl group as that used in Example 1 and heat their mixture with 3 g of catalyst C of Example 5 under stirring. When a temperature of 130° C. to 140° C. was reached, 30 g of the same silica as that used in Example 1 were added and mixed uniformly by a homomixer. The resulting mixture is reacted at 180° C. for 4 hours, heated at 180° C. under a reduced pressure of 40 mm of mercury for 1 hour and then cooled to room temperature in order to obtain a silicone defoamer composition designated as Composition s.

METHOD OF TESTING DEFOAMING PROPERTY

Each of the compositions produced as hereinabove described was emulsified in accordance with the following recipe to prepare a 10% emulsion:

| | |
|---|---|
| Composition | 10 parts by weight |
| Polyoxyethylene monostearate | 1.4 parts by weight |
| Fatty acid ester of glycerin | 1.2 parts by weight |
| Hydroxyethyl cellulose | 1.5 parts by weight |
| Antiseptic agent | 0.1 part by weight |
| Water | Balance to 100 parts by weight. |

A known amount of the emulsion was added to a foaming composition and was shaken for 10 seconds by a barrel wrist action shaker under the conditions as will hereinafter be set forth. The time t (seconds) between the discontinuance of shaking and the disappearance of large bubbles and the time T (seconds) between the discontinuance of shaking and the appearance of the liquid surface were measured. Then, it was shaken again for 40 seconds and the time was likewise measured. The test was further continued by increasing the shaking time to 60, 120 and 180 seconds. The results are shown in Table 1.

| | |
|---|---|
| Test apparatus: | Glass bottle having a capacity of 200 ml; |
| Foaming agent: | 100 ml of a 1% aqueous solution of Tween 80; |
| Amount of defoamer used: | Amount giving a silicone content of 20 ppm; |
| Shaking frequency: | 350 cycles per minute; |
| Test temperature: | 25° C. |

EXAMPLE 10

The reactor and procedure of Example 1 were used to stir and heat 558 g of polydimethylsiloxane having an end hindered by a hydroxyl group and having a viscosity of 12,500 cs at 25° C. and 24 g of normal ethyl silicate ("Silicate 28" of Tama Kagaku Kogyo Co., Ltd.). The heating and stirring of the mixture were continued after 3 g of an alkaline catalyst, which had been obtained by reacting 90 g of ethyl alcohol and 10 g of KOH at 60° C. to 80° C., had been added. When a temperature of 130° C. to 140° C. was reached, 30 g of the same silica as that used in Example 1 were uniformly dispersed by a homomixer. A reaction was caused by heating at 180° C. to 185° C. for about four hours under stirring. The reaction product was cooled to ambient temperature to yield a silicone defoamer composition (Composition J).

The defoaming property of Composition J was tested by the method hereinabove described. The results are shown in Table 1.

EXAMPLE 11

The reactor and procedure of Example 1 were used to stir and heat 210 g of polydimethylsiloxane end-blocked by trimethylsilyl groups and having a viscosity of 100 cs at 25° C., 300 g of polydimethylsiloxane having an end hindered by a hydroxyl group and having a viscosity of 12,500 cs at 25° C. and 24 g of ethyl polysiloxane ("Silicate 45" of Tama Kagaku Kogyo Co., Ltd.). The heating and stirring were continued after 3 g of catalyst A of Example 1 had been added. Then, 30 g of the same silica as that used in Example 1 were uniformly dispersed by a homomixer. After 30 g of polydimethylsiloxane having an end hindered by a hydroxyl group and having a viscosity of 40 cs at 25° C. had been added, the mixture was reacted by heating at 180° C. for about four hours under stirring. The reaction product was heated for an hour at 180° C. and a reduced pressure of 40 mm Hg, whereby the by-product of the reaction was removed. Then, it was cooled to ambient temperature to yield a silicone defoamer composition (Composition K).

The defoaming property of Composition K was tested by the method hereinbefore described. The results are shown in Table 1.

EXAMPLE 12

384 g of polydimethylsiloxane having an end hindered by trimethylsilyl and having a viscosity of 1,000 cs at 25° C. and 50 g of a siloxane resin consisting of $(CH_3)_3SiO_{1/2}$ and $SiO_2$ units and having a $(CH_3)_3SiO_{1/2}/SiO_2$ ratio of 0.4/1 to 1.2/1 were uniformly mixed with stirring in a one-liter beaker. Added to the mixture were 70 g of polydimethylsiloxane having an end hindered by a hydroxyl group and having a viscosity of 40 cs at 25° C. After several minutes of stirring, 3 g of a catalyst A of Example 1 were added and heating was started. When a temperature of 130° C. to 140° C. was reached, 30 g of silica of the same type as that used in Example 1 were uniformly dispersed by a homomixer. Then, the apparatus of Example 1 was used to carry out two hours of reaction at 230° C. The reaction product was heated for an hour at 180° C. and a reduced pressure of 40 mm Hg, whereby the unreacted matter and the by-product of the reaction were removed. Then, it was cooled to ambient temperature to yield a silicone defoamer composition (Composition L).

TABLE 1*

| Example, Composition | t (sec.)/T (sec.) v. Shake Time | | | | | |
|---|---|---|---|---|---|---|
| | 10 sec. | 40 sec. | 60 sec. | 120 sec. | 180 sec. | 180 sec. |
| 1,A | 3/3 | 3/3 | 4/16 | 8/16 | 15/30 | 17/63 |
| 2,B | 2/2 | 3/3 | 8/12 | 15/33 | 22/93 | 34/120 |
| 3,C | 2/2 | 3/3 | 6/8 | 10/17 | 16/42 | 20/83 |
| 4,D | 3/3 | 3/3 | 6/7 | 8/15 | 24/50 | 35/82 |
| 5,E | 2/2 | 2/2 | 4/6 | 8/15 | 14/42 | 19/75 |
| 6,F | 3/3 | 3/4 | 5/8 | 12/35 | 20/52 | 32/78 |
| 7,G | 3/3 | 3/3 | 4/6 | 9/18 | 16/35 | 25/80 |
| 8,H | 3/3 | 3/4 | 7/12 | 15/28 | 22/83 | 32/120 |
| 9,I | 2/2 | 3/3 | 4/7 | 9/16 | 15/54 | 21/87 |
| 10,J | 2/2 | 3/3 | 4/6 | 12/25 | 22/56 | 30/100 |
| 11,K | 3/3 | 3/3 | 4/6 | 9/16 | 15/50 | 18/72 |
| 12,L | 4/4 | 4/4 | 6/7 | 10/20 | 16/39 | 23/71 |
| Comp. 1,P | 2/2 | 2/2 | 4/40 | 13/104 | 26/>120 | 64/— |
| Comp. 2,Q | 2/2 | 2/3 | 5/31 | 16/47 | 40/>120 | 95/— |
| Comp. 3,R | 3/4 | 3/4 | 7/11 | 18/>120 | 42/— | >120/— |
| Comp. 4,S | 2/2 | 3/4 | 5/18 | 13/54 | 28/>120 | 45/>120 |

*The sign ">120" means that the time was over 120 seconds.
The sign "—" means that the time was so long that its measurement was considered meaningless.

That which is claimed is:

1. A method of producing a silicone defoamer composition comprising reacting at a temperature of 50° C. to 300° C.: (1) 0 to 100 parts by weight of a polyorganosiloxane having a viscosity of 20 to 100,000 cs at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of from 1.9 to 2.2;
   (2) 0 to 100 parts by weight of a polyorganosilxoane having a viscosity of 200 to several million cs at 25° C. expressed by the general formula $R^2(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of from 1.9 to 2.2 and c has a sufficiently large value to give at least one $-OR^3$ group in each molecule, said $-OR^3$ group being present at least at the end of a molecular chain; the total of components (1) and (2) being 100 parts by weight;
   (3) 0.5 to 20 parts by weight for every 100 parts by weight of said components (1) and (2) of one or more compounds selected from the following a) to d):
     (a) an organosilicon compound of the general formula $R^4_d SiX_{4-d}$ in which $R^4$ is a monovalent hydrocarbon group having 1 to 5 carbon atoms, X is a hydrolyzable group and d has an average value of one or less;
     (b) a partially hydrolyzed condensate of said compound (a);

(c) a siloxane resin consisting essentially of $(CH_3)_3SiO_{1/2}$ and $SiO_2$ units and having a $(CH_3)_3SiO_{1/2}/SiO_2$ ratio of 0.4/1 to 1.2/1;
(d) a condensate of said compound (c) with said compound (a) or (b);
(4) 0.5 to 30 parts by weight of a finely divided filler for every 100 parts by weight of said components (1) and (2);
(5) a catalytic amount of a compound for promoting the reaction of the other components; and
(6) 0 to 20 parts by weight, for every 100 parts by weight of said components (1) and (2), of a polyorganosiloxane having a viscosity of 5 to 200 cs at 25° C. and being expressed by the general formula $R^8_e(R^{9O})_fSiO(4-e-f)/2$ in which $R^8$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 on an average and f has a sufficiently large value to give at least two $-OR^9$ groups in each molecule at the end of a molecular chain.

2. A method according to claim 1 wherein the amount of component (2) is limited to less than 5 parts by weight.

3. A method according to claim 2 wherein the $R^1$ groups of component (1), the $R^2$ groups of component (2) and the $R^8$ groups of component (6) are hydrocarbon groups; the X groups of component (3) (a) are $-OR^5$ groups or $-OR^{60}R^7$ groups in which $R^6$ is a divalent hydrocarbon group having 1 to 5 carbon atoms and $R^5$ and $R^7$ are each hydrogen or a monovalent hydrocarbon group having 1 to 5 carbon atoms; component (4) is silica; and component (5) is a compound selected from the group consisting of alkali metal hydroxides, alkali metal silanolates, alkali metal alkoxides and metal salts of organic acids.

4. A method according to claim 3 wherein component (1) is a trimethylsiloxy-endblocked polydimethylsiloxane fluid having a viscosity of from 350 to 15,000 centistokes at 25° C.; component (2) is a hydroxyl-endblocked polydimethylsiloxane fluid having a viscosity of from 1,000 to 50,000 centistokes at 25° C.; component (4) is a silica having a surface area of from 50 to 500 m²/g; and component (6) is a hydroxyl-endblocked polydimethylsiloxane having a viscosity of from 10 to 50 centistokes at 25° C.

5. A method according to claim 4 wherein component (5) is a catalyst for the inter-condensation of silicon-bonded hydroxyl groups and/or silicon-bonded alkoxyl groups.

6. A method according to claim 4 wherein component (5) is a catalyst for the rearrangement of siloxane bonds.

7. A method according to claim 6 wherein component (5) is a reaction product of potassium hydroxide and component (3).

8. A silicone defoamer composition obtained by the method of claim 1.

9. A silicone defoamer composition obtained by the method of claim 2.

10. A silicone defoamer composition obtained by the method of claim 3.

11. A silicone defoamer composition obtained by the method of claim 4.

12. A silicone defoamer composition obtained by the method of claim 5.

13. A silicone defoamer composition obtained by the method of claim 6.

14. A silicone defoamer composition obtained by the method of claim 7.

15. A method according to claim 1 further comprising mixing a diluent with the silicone defoamer composition to provide a diluted silicone defoamer composition.

16. A method according to claim 15 wherein the mixing is accomplished by emulsifying the silicone defoamer composition in water.

17. A method according to claim 15 wherein the mixing is accomplished by dispersing the silicone defoamer composition into a solvent therefor.

18. The diluted silicone defoamer composition prepared by the method of claim 15.

19. The diluted silicone defoamer composition prepared by the method of claim 16.

20. The diluted silicone defoamer composition prepared by the method of claim 17.

* * * * *